United States Patent
Chen et al.

(10) Patent No.: US 8,897,316 B2
(45) Date of Patent: Nov. 25, 2014

(54) ON-CHIP PACKET CUT-THROUGH

(75) Inventors: Edmund Chen, Sunnyvale, CA (US);
Ramanathan Lakshmikanthan, Santa Clara, CA (US); Ranjit Rozario, San Jose, CA (US); Brian Alleyne, Los Gatos, CA (US); Stephen Chow, Monte Sereno, CA (US); Patrick Wang, Palo Alto, CA (US); Edward Ho, Fremont, CA (US); Thomas Yip, Los Gatos, CA (US); Sun Den Chen, San Jose, CA (US); Michael Feng, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 711 days.

(21) Appl. No.: 12/983,104

(22) Filed: Dec. 31, 2010

(65) Prior Publication Data

US 2012/0170472 A1 Jul. 5, 2012

(51) Int. Cl.
| | | |
|---|---|---|
| *H04L 12/54* | (2006.01) | |
| *H04L 12/861* | (2013.01) | |
| *H04L 12/801* | (2013.01) | |
| *H04L 12/851* | (2013.01) | |
| *H04L 12/823* | (2013.01) | |

(52) U.S. Cl.
CPC ............. *H04L 49/9073* (2013.01); *H04L 47/12* (2013.01); *H04L 47/2441* (2013.01); *H04L 47/32* (2013.01); *H04L 49/9036* (2013.01); *H04L 49/9063* (2013.01); *H04L 49/9078* (2013.01)
USPC .......................................................... 370/429

(58) Field of Classification Search
None
See application file for complete search history.

(56) References Cited

U.S. PATENT DOCUMENTS

| | | | |
|---|---|---|---|
| 7,551,617 B2 | 6/2009 | Eatherton et al. | |
| 2003/0112801 A1 | 6/2003 | Calle et al. | |
| 2003/0214948 A1* | 11/2003 | Jin et al. ......................... | 370/392 |
| 2003/0231645 A1* | 12/2003 | Chandra et al. ................ | 370/412 |
| 2005/0152369 A1* | 7/2005 | Ambe et al. .................... | 370/392 |
| 2005/0169291 A1* | 8/2005 | Key et al. ....................... | 370/412 |
| 2008/0276062 A1* | 11/2008 | Cobley .......................... | 711/170 |
| 2009/0074002 A1* | 3/2009 | Kam et al. ..................... | 370/429 |
| 2012/0106555 A1* | 5/2012 | Gumaste .................. | 370/395.53 |

OTHER PUBLICATIONS

"Traffic Management," Jul. 1, 2010, 3 pages, Xelerated, downloaded from http://web.archive.org/web/20100701012743/http://www.xelerated.com/enitraffic-manage... on Apr. 17, 2013.

(Continued)

*Primary Examiner* — Chirag Shah
*Assistant Examiner* — Amar Persaud
(74) *Attorney, Agent, or Firm* — Blakely Sokoloff Taylor Zafman, LLP

(57) ABSTRACT

Embodiments of the invention include a method for avoiding memory bandwidth utilization during packet processing. The packet processing core receives a plurality of packets. The packet processing core identifies the packet's quality of service (QoS) descriptor. The packet processing core determines that at least one packet should be moved to an off-chip packet stored prior to the packet being transmitted to the egress port. The packet processing core bases that determination, at least in part, on the packet's QoS descriptor. The packet processing core moves the determined packets to the off-chip packet store. The packet processing core determines that at least one packet should not be moved to the off-chip packet store prior to the packet being transmitted to the egress port. This determination is also made, at least in part, based on the packet's QoS descriptor.

16 Claims, 7 Drawing Sheets

(56) References Cited

OTHER PUBLICATIONS

Girish B.C. et al., "A Petri Net Model for Evaluating Packet Buffering Strategies in a Network Processor," 2007, 10 pages, Fourth International Conference on the Quantitative Evaluation of Systems, IEEE.

Jorge Garcia-Vidal et al., "A DRAM/SRAM Memory Scheme for Fast Packet Buffers," May 2006, 15 pages, IEEE Transactions on Computers, vol. 55, No. 5.

Simon Hauger et al., "Packet Processing at 100 Gbps and Beyond—Challenges and Perspectives," 10 pages, downloaded from www.ikr.uni-stuttgart.de on Jun. 15, 2010.

Girish B.C. et al., "Reducing Buffer Requirements in Core Routers using Dynamic Buffering," 2009, 6 pages, IEEE.

B. Braden et al., "Recommendations on Queue Management and Congestion Avoidance in the Internet," Apr. 1998, 17 pages, Network Working Group, Request for Comments: 2309, The Internet Society.

"The Cisco QuantumFlow Processor: Cisco's Next Generation Network Processor," 2008, 13 pages, Cisco Systems, Inc.

"The Unified Wire Engine, Introducing Terminator 3, A Chelsio Communications White Paper," 6 pages, Chelsio Communications, The Unified Wire Engine, downloaded from http://www.hamburgnet.de/products/chelsio/ T3_ASIC_White_Paper.pdf on Jun. 4, 2010.

Girish B.C., "Efficient Techniques Exploiting Memory Hierarchy to Improve Network Processor Performance," Jun. 2008, 102 pages, A Thesis Submitted for the Degree of Master of Science (Engineering) in the Faculty of Engineering, Supercomputer Education and Research Centre Indian Institute of Science, Bangalore 560 012.

"Enabling Quality of Service With Customizable Traffic Managers," Sep. 2005, 7 pages, White Paper, Ver. 1.0, Altera Corporation, San Jose, California.

\* cited by examiner

ON-CHIP PACKET CUT-THROUGH

FIELD OF THE INVENTION

Embodiments of the invention relate generally to the field of telecommunications; and more particularly, to packet processors in a network element.

BACKGROUND

Much of today's telecommunication networks consist of a series of interconnected packet networks. As a packet travels through these networks, it will be processed by numerous network elements. Various network elements will inspect, prioritize, discard, and/or forward the packet through the various networks on which the network elements exists. These operations are performed by processing units within the network elements, and often times the processing units are specially designed packet processing cores within the network element. Quite often, a packet processing core comprises some on-chip packet store (e.g. cache or RAM) and is coupled to some off-chip packet store (e.g. RAM or disk). As each packet arrives at a network element, the packet processing core responsible for each packet will transfer the packets from the on-chip packet store to the off-chip packet store until each packet is ready to be transmitted out of the network element, at which time the packet processing core will retrieve the packet from the off-chip packet store and transmit the packet out of the network element. Because each packet is transferring between on-chip and off-chip packet stores, the packet processing core must be coupled to an off-chip packet store over a data bus that is capable of carrying each and every packet at line rate so that congestion does not occur during network saturation. This means that as packet processing core speed increases and the bandwidth of the network element increases, so must the data bus bandwidth between the packet processing core and the off-chip packet store.

SUMMARY OF THE INVENTION

Embodiments of the invention include a method performed in a packet processing core that is coupled between an ingress port and an egress port, and the method is for avoiding memory bandwidth utilization during packet processing. The packet processing core receives a plurality of packets from the ingress port and stores each packet in an on-chip packet store. The packet processing core identifies the packet's quality of service (QoS) descriptor. For a first set of the received packets, the packet processing core determines that at least one packet should be moved to an off-chip packet stored prior to the packet being transmitted to the egress port. The packet processing core bases that determination, at least in part, on the packet's QoS descriptor. The packet processing core moves the determined packets to the off-chip packet store. For a second set of the received packets, the packet processing core determines that at least one packet should not be moved to the off-chip packet store prior to the packet being transmitted to the egress port. This determination is also made, at least in part, based on the packet's QoS descriptor. This method conserves memory bandwidth utilization on a data bus between the on-chip packet store and the off-chip packet store because the packets determined not to be moved are not sent over the data bus.

Embodiments of the invention include a line designed to avoid memory bandwidth utilization during packet processing. The line card comprises an ingress port, an egress port, an off-chip packet store, and a packet processing core. The ingress port is configured to receive a plurality of packets. The egress port is configured to transmit a plurality of packets. The off-chip packet store is configured to store one or more off-chip packet queues, each off-chip packet queue is configured to store one or more packets received by the ingress port prior to the packet processing core transmitting those packets to the egress port. The packet processing core configured to process a plurality of packets received by the ingress port and comprising an on-chip packet store, a QoS descriptor module, and a traffic manager module. The on-chip packet store is configured to store one or more on-chip packet queues, each on-chip packet queue is configured to store one or more packets received by the ingress port prior to the packet processing core transmitting those packets to the egress port. The traffic classification module configured to generate a QoS descriptor for each packet that the packet processing core is to process and the QoS descriptor is to indicate the corresponding packet's QoS characteristics. The traffic manager module is configured to shape packet traffic and mark one or more of the packets to be processed by the packet processing core for on-chip packet storage or off-chip packet storage. The marking of the packet is to be based, at least in part, on that packet's QoS descriptor. At least one packet is to be marked for on-chip packet storage and at least one packet is to be marked for off-chip packet storage. The packet processing core is further configured to move only those packets marked for off-chip packet storage to the off-chip packet store and to keep packets marked for on-chip packet storage in the on-chip packet store until those packets are transmitted to the egress port. This packet processing core conserves off-chip memory bandwidth by only transferring packets marked for off-chip packet storage to the off-chip packet store.

Embodiments of the invention include a method performed in a packet processing core that is coupled between an ingress port and an egress port, and the method is for avoiding memory bandwidth utilization during packet processing. The packet processing core receives a first packet from the ingress port and builds a first QoS descriptor for the first packet. The packet processing core stores the first packet in a first packet queue in an on-chip packet store, the first packet queue associate with the first QoS descriptor. The packet processing core receives a second packet from the ingress port and builds a second QoS descriptor. The packet processing core stores the second packet in a second packet queue in an off-chip packet store, the second packet queue associated with the second QoS descriptor. This method conserves memory bandwidth utilization on a data bus between the on-chip packet store and the off-chip packet store because the first packet is not sent over the data bus.

BRIEF DESCRIPTION OF THE DRAWINGS

The present invention is illustrated by way of example, and not by way of limitation, in the figures of the accompanying drawings in which like references indicate similar elements.

The invention may best be understood by referring to the following description and accompanying drawings that are used to illustrate embodiments of the invention. In the drawings.

DETAILED DESCRIPTION

In the following description, numerous specific details resource partitioning/sharing/duplication implementations, types and interrelationships of system components, and integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention are directed to apparatus and methods for moving some packets to an off-chip packet store while leaving other packets in an on-chip packet store. The embodiments have the benefit of allowing for a reduction in the required amount of bandwidth to the off-chip packet store because not all packets are sent to the off-chip packet store.

Figure 1:
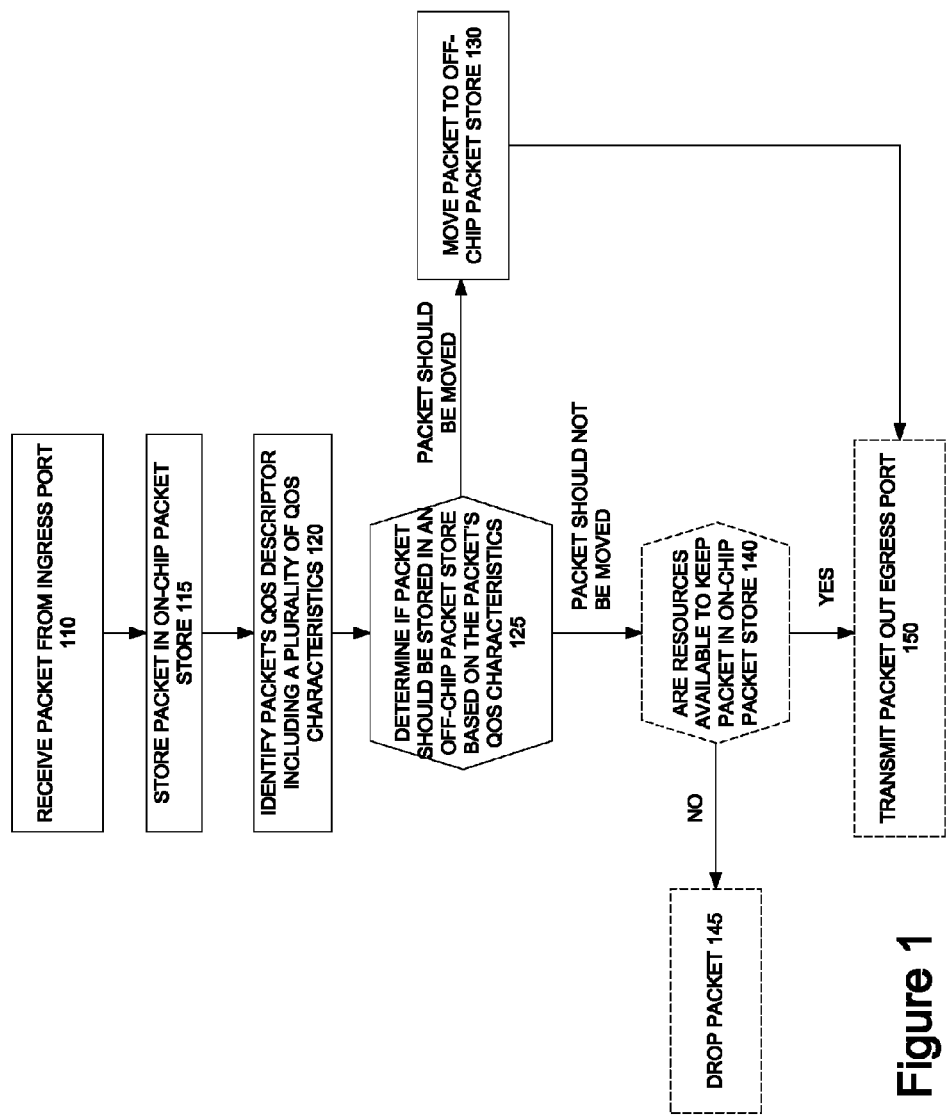
FIG. 1 is a flow chart illustrating a method for selectively moving packets to off-chip memory according to embodiments of the invention.

FIG. 1 is a flow chart illustrating a method for selectively moving packets to off-chip memory according to embodiments of the invention. In one embodiment, the method of FIG. 1 is performed by a packet processing core, while in other embodiments the method is performed by a general processor. This flow chart shows one embodiment for moving some packets to the off-chip packet store while keeping some packets in the on-chip packet store. The figure illustrates a series of steps of a method as individual blocks. Some steps are optional, depending on the particular embodiment, and are shown in dashed markings to indicate the step may or may not be present in each embodiment.

FIG. 1 begins at the top with block 110 indicating that a packet is received from an ingress port. As the packet is received from the ingress port, the packet is stored in an on-chip packet store 115. Each packet has one or more QoS characteristics. QoS characteristics comprise attributes such as a common traffic priority, common data type, or common network protocol. In other embodiments, the QoS characteristics further comprise packet coloring, class of service, isolation group, or packet size. Still further embodiments may utilize more or less packet attributes for QoS characteristics. In block 120, the packet's QoS descriptor is identified 120 according to the packet's QoS characteristics.

After the packet's QoS descriptor is identified in block 120, a determination is made, block 125, for whether a packet should be stored in the on-chip packet store or an off-chip packet store. This determination is based, at least in part, on the packet's identified QoS descriptor. In the case that it is determined that the packet should be moved to the off-chip packet store, the method continues at block 130 with moving the packet to the off-chip packet store. In the case that the packet should not be moved, the packet is not moved to the off-chip packet store.

In some embodiments, processing after determining not to move the packet will continue, at dashed block 140, by checking if there are resources available to keep the packet in the on-chip packet store. If resources are not available, then the method will drop the packet, shown in dashed block 145. If resources are available, then the packet will stay in on-chip memory.

In one embodiment of the invention, the packet will stay in on-chip or off-chip memory until the method is able to transmit the packet out to the egress port as shown in dashed block 150. However, in other embodiments, the packet may stay in the on-chip packet store or the off-chip packet store until the packet can be transmitted to another module for additional processing. For example, in one embodiment the packet is passed to a weighted random early detection module that determines whether traffic should be dropped according to the current state of the network and network congestion. In another embodiment, the packet is sent to a traffic scheduler that is responsible for scheduling packets for egress according to well defined rules and conditions.

Figure 2:
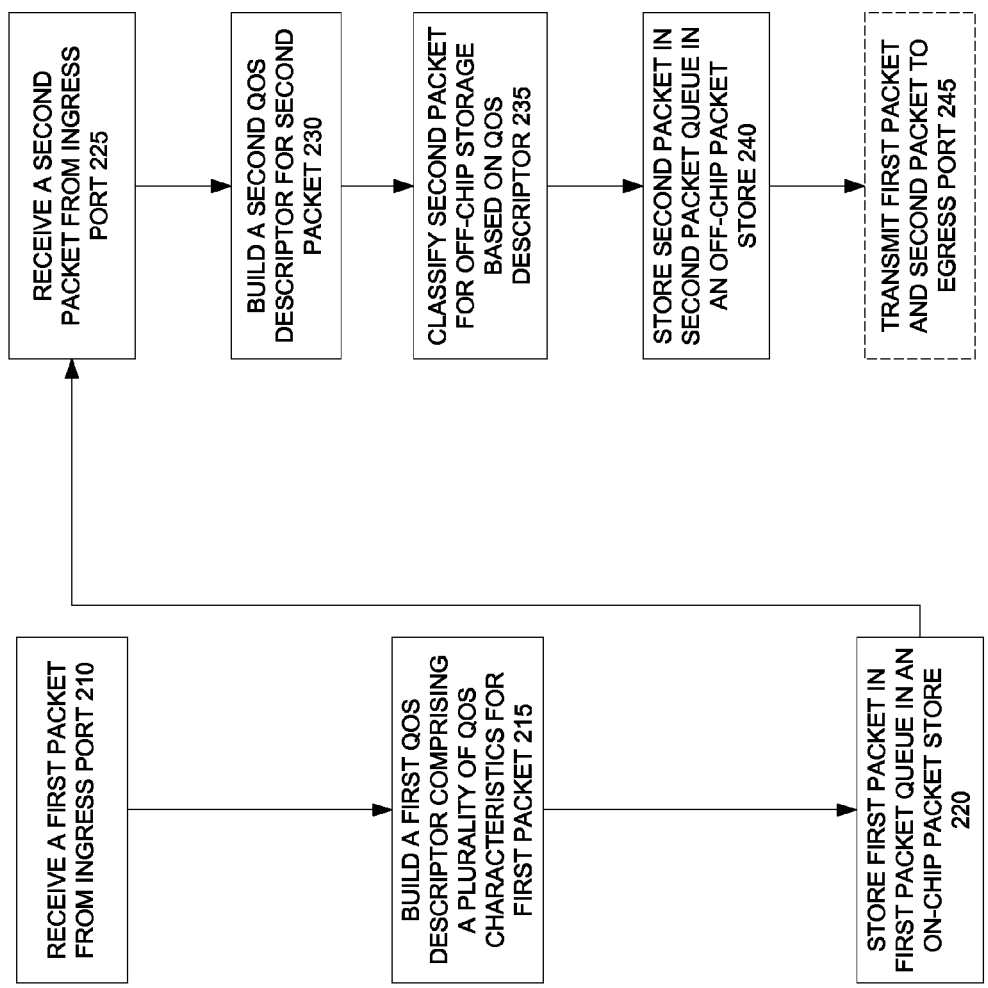
FIG. 2 is a flow chart illustrating a method for storing a first packet in an on-chip packet queue and storing a second packet in an off-chip packet queue according to embodiments of the invention.

FIG. 2 is a flow chart illustrating a method for storing a first packet in an on-chip packet queue and storing a second packet in an off-chip packet queue according to embodiments of the invention. The method begins at block 210 with receiving a first packet from an ingress port. After receiving the first packet, the method, in block 215, builds a first QoS descriptor for that packet including a plurality of QoS characteristics. The method continues by storing the first packet in a first packet queue in an on-chip packet store at block 220.

Sometime later, a second packet is received from the ingress port at block 225. The method continues by building a second QoS descriptor for the second packet, block 230, in the same manner which the first QoS descriptor was built in block 215. The second packet is classified, block 235, for off-chip packet storage based on one or more of the plurality of QoS characteristics in the QoS descriptor. The second packet is then stored, block 240, in a second packet queue in an off-chip packet store.

In one embodiment of the invention, the first packet will stay in the on-chip packet store and the second packet will stay in the off-chip packet store until the method is able to transmit the packets out to the egress port as shown in dashed block 245. However, in other embodiments, the first packet will stay in the on-chip packet store and the second packet will stay in the off-chip packet store until the packets can be transmitted to another module for additional processing. For example, in one embodiment the packets are passed to a weighted random early detection module that determines whether packets should be dropped according to the current state of the network and network congestion. In another embodiment, the packets are sent to a traffic scheduler that is responsible for scheduling packets for egress according to well defined rules and conditions.

Figure 3:
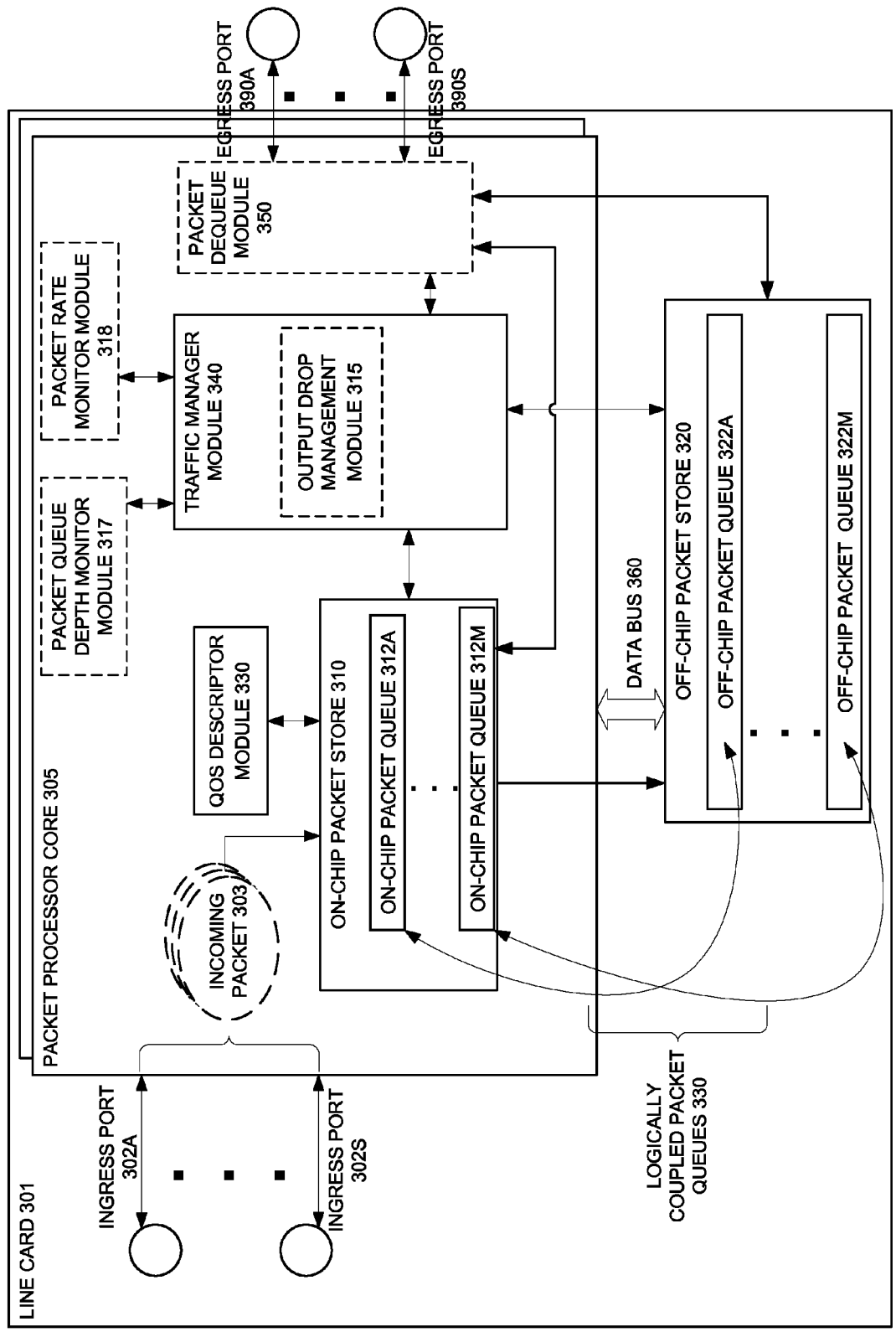
FIG. 3 is a block diagram illustrating a line card of a network element including an ingress port, an egress port, an off-chip packet store, and a packet processor core that includes an on-chip packet store according to embodiments of the invention.

FIG. 3 is a block diagram illustrating a line card of a network element including an ingress port, an egress port, an off-chip packet stores, and a packet processor core that includes an on-chip packet store according to embodiments of the invention. This figure includes modules that are optional depending on the specific implementation and shown in dashed boxes.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

In one embodiment, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms. Alternative embodiments may use different network element architectures (e.g. where there is not separation of line cards and control cards).

FIG. 3 will be described with reference to the exemplary operations of FIG. 1 and FIG. 2. However, it should be understood that the operations of FIG. 1 and FIG. 2 can be performed by embodiments other than those discussed with reference to FIG. 3. Furthermore, FIG. 3 can perform operations different than those described with reference to FIG. 1 and FIG. 2.

In FIG. 3 a packet processing core 305 is coupled between one or more ingress ports 302A-302S and one or more egress ports 390A-390S. In one embodiment, the packet processing core 305 inspects, prioritizes, discards, and/or forwards packets as required in a particular line card. In other embodiments, the packet processing core 305 enables the specialized processing required for a particular network element. In other embodiments, the packet processing core 305 provides more or less functionality depending on the specific functionality required in the implementation of the network element or line card 301.

During the operation of a line card 301, the packet processing core 305 receives one or more incoming packets 303 from the ingress ports 302A-302S. The packet processing core 305 stores each received packet 303 into an on-chip packet store 310. While in one embodiment the on-chip packet store is RL-DRAM (reduced-latency dynamic random access memory), alternative embodiments may use other types of memory (e.g., eDRAM (embedded dynamic random access memory)). The on-chip packet store 310 includes one or more on-chip packet queues 312A-312M. The packet processing core 305 is further coupled to an off-chip packet store 320 across a data bus 360. While in one embodiment the off-chip packet store 320 is DDR-DRAM (double date rate dynamic random access memory), alternative embodiments may utilize other types of memory (e.g., SDR-DRAM (single date rate dynamic random access memory)). Furthermore, while the off-chip packet store 320 is shown within the line card 301, other embodiments may utilize an off-chip packet store 320 that is not contained within in the line card 301 but exists outside of the line card 301 and is coupled to the line card 301.

The off-chip packet store 320 includes one or more off-chip packet queues 322A-322M. In one embodiment, the data bus 360 is large enough and fast enough to transfer every incoming packet 303 from the on-chip packet store 310 to the off-chip packet store 320 at the same rate in which the packets arrive to the packet processing core 305 such that all packets could be transferred to the off-chip packet store 320. In another embodiment, the data bus 360 is not large enough or fast enough to transfer every packet to the off-chip packet store 320 because it is expected that at least some of the incoming packets 303 will stay in the on-chip packet store 310 until they are transmitted to the egress ports 390A-390S. In this embodiment, the data bus 360 need not be capable of transferring each and every packet to the data bus 360.

Minimizing the amount of packets moved from the on-chip packet store to the off-chip packet store has the further benefit of reducing the average power consumption of the line card 301 and the network element utilizing the line card 301. Furthermore, embodiments of the invention allow memory resources to be utilized by additional functions and improve system performance by reducing the movements of packets from the on-chip packet store 310 to the off-chip packet store 320.

Each on-chip packet queue 312A-312M corresponds to one or more packet groups, further each off-chip packet queue 322A-322M corresponds to one or more packet groups. At least one packet queue 312A-312M is logically couple to at least one off-chip packet queue 322A-322M to represent one or more logically coupled packet queues 330. In FIG. 3, this is illustrated as a curved lined between on-chip packet queue 312A in the on-chip packet store 310 and off-chip packet queue 322A in the off-chip packet store 320. A logically coupled packet queue, e.g. the logically coupled packet queue of 312A and 322A, stores packets belonging to one or more packet groups. As such, a first packet from a packet group resides in the on-chip packet queue 312A while a second packet from the same packet group resides in the off-chip packet queue 322A. Although the two packets are in two distinct packet queues, the queues are in the same logically coupled packet queue. These packet queues may take the form of any well known queue data structure. In one embodiment, these packet queues may each be a linked list in which each list element contains a packet, or a memory address of a packet, and contains an address to the next list element in the queue. In this way, an element in the on-chip packet queue 312A may point to an element in the off-chip packet queue 322A. In other embodiments, the packet queues may take the form of a dynamic array, a VList, a skip list, a binary tree, or a hashtable.

In one embodiment, the received packet is first stored in the on-chip packet store 310 prior to a QoS descriptor being built for the packet by a QoS descriptor module 330. In another embodiment, the packet's QoS descriptor is generated by the QoS descriptor module 330 prior to being stored in the on-chip packet store 310. The QoS descriptor module 330 builds each QoS descriptor based on a plurality of QoS characteristics of the packet. Once the QoS descriptor is built, the packet is stored in one of several packet queues, the specific packet queue being designated for packets that share at least one of the plurality of QoS characteristics. Packets designated for the same packet queue are considered to have significant similarity, based on shared QoS characteristics, such that these packets are considered part of a packet group.

After a packet's QoS descriptor is built by the QoS descriptor module 330, a traffic manager module 340 will designate the packet for storage in one of a plurality of on-chip packet queues 312A-312M or one of a plurality of off-chip packet queues 322A-322M. The traffic manager module is coupled between the on-chip packet store 310 and the egress ports 390A-390S. The traffic manager module 340 designates each packet for storage in either the on-chip packet store 310 or the off-chip packet store 320 based upon that packet QoS characteristics within that packet's QoS descriptor. Embodiments for determining which packets should be designated for on-chip storage and which packets should be designated for off-chip storage will be further described with reference to FIGS. 5, 6, and 7. In one embodiment, the traffic manager module 340 further comprises an output drop management module 315 that utilizes one or more of a packet's QoS characteristics to determine whether that packet should be dropped and not transmitted to one of the egress ports 390A-390S instead of being stored in the on-chip packet store 310 or the off-chip packet store 320. Embodiments of the operation of the output drop management module 315 are described later with reference to FIGS. 5, 6 and 7. Still further embodiments of the ODM module 315 also perform the on-packet storage or off-chip packet storage determination.

Optionally, the packet processor core 305 includes a packet queue depth monitor module, shown as a dashed block 317, that is further coupled to the traffic manager module 340. In one embodiment, the packet queue depth monitor module 317 keeps track of how many packets are stored in one or more of the on-chip packet queues 312A-312M and one or more of the off-chip packet queues 322A-322M. In another embodiment, the packet queue depth monitor module 317 keeps track of how much storage space is available for packets in one or more of the on-chip packet queues 312A-312M and one or more of the off-chip packet queues 322A-322M. In one embodiment, the traffic manage module 340 utilizes the packet queue depths or available space in the packet queues 312A-312M and 322A-322M to determine whether an incoming packet 303 should be stored in the on-chip packet store 310 or the off-chip packet store 320. In embodiments utilizing the output drop management module 315, the output drop management module 315 may further utilize the packet queue depths or available space in the packet queues 312A-312M and 322A-322M to determine whether to drop an incoming packet 303.

Optionally, the packet processor core 305 includes a packet rate monitor module, shown as a dashed block 317, that is further coupled to the traffic manage module 340. The packet rate monitor module 318 keeps track of the packet rate corresponding to one or more packet groups. In one embodiment, the packet rate refers to the number of incoming packets 303 arriving at the packet processor core 305 that belong to a common packet group. For each packet group, the packet rate monitor maintains a statistic representing the number of packets arriving over a given period of time for packets in that packet group. In another embodiment, the packet rate refers to the number of packets being transmitted out the egress ports 390A-390M belonging to a common pack group over a given period of time. In yet another embodiment, the packet rate monitor module 318 maintains statistics for both an incoming packet rate and an outgoing packet rate for each packet group. In one embodiment, the traffic manager module 340 utilizes the packet rate for the packet group that incoming packets 303 belong to as part of the determination of whether each incoming packet 303 will be designated for storage in the on-chip packet store 310 or the off-chip packet store 320. In embodiments utilizing the output drop management module 315, the output drop management module 315 may further utilize the packet rates to determine whether to drop an incoming packet 303.

Optionally, the packet processor core 305 includes a packet dequeue module 350, shown as a dashed block 350, that is further coupled to the traffic manager module 340 and coupled to the egress ports 390A-390S. The packet dequeue module 350 retrieves packets that are to be transmitted from the on-chip packet store 310 and the off-chip packet store 320 for transmission to the egress ports 390A-390S. In one embodiment, the packet dequeue module 350 retrieves the packets in the order which the packets were received. In another embodiment, the packet dequeue module 350 determine which packet should be transmitted next and sends the packet to the egress ports 390A-390S. In yet another embodiment, the traffic manager module 340 determines the order in which packets should be transmitted to the egress ports 390A-390S and informs the packet dequeue module 350 of the order in which the packets should be dequeued and transmitted to the egress ports 390A-390S.

In one embodiment, the determination of which egress port 390A-390S a packet should be transmitted to may based upon the destination address of that packet. For example, a packet may have a destination address that is only accessible through egress port 390B, or the preferred route for a particular destination may dictate that the packet exit through port 390C. In another embodiment, the egress port used to transmit a given packet may be based upon the QoS descriptor of that packet and the congestion level of the egress ports 390A-390S.

Figure 4:
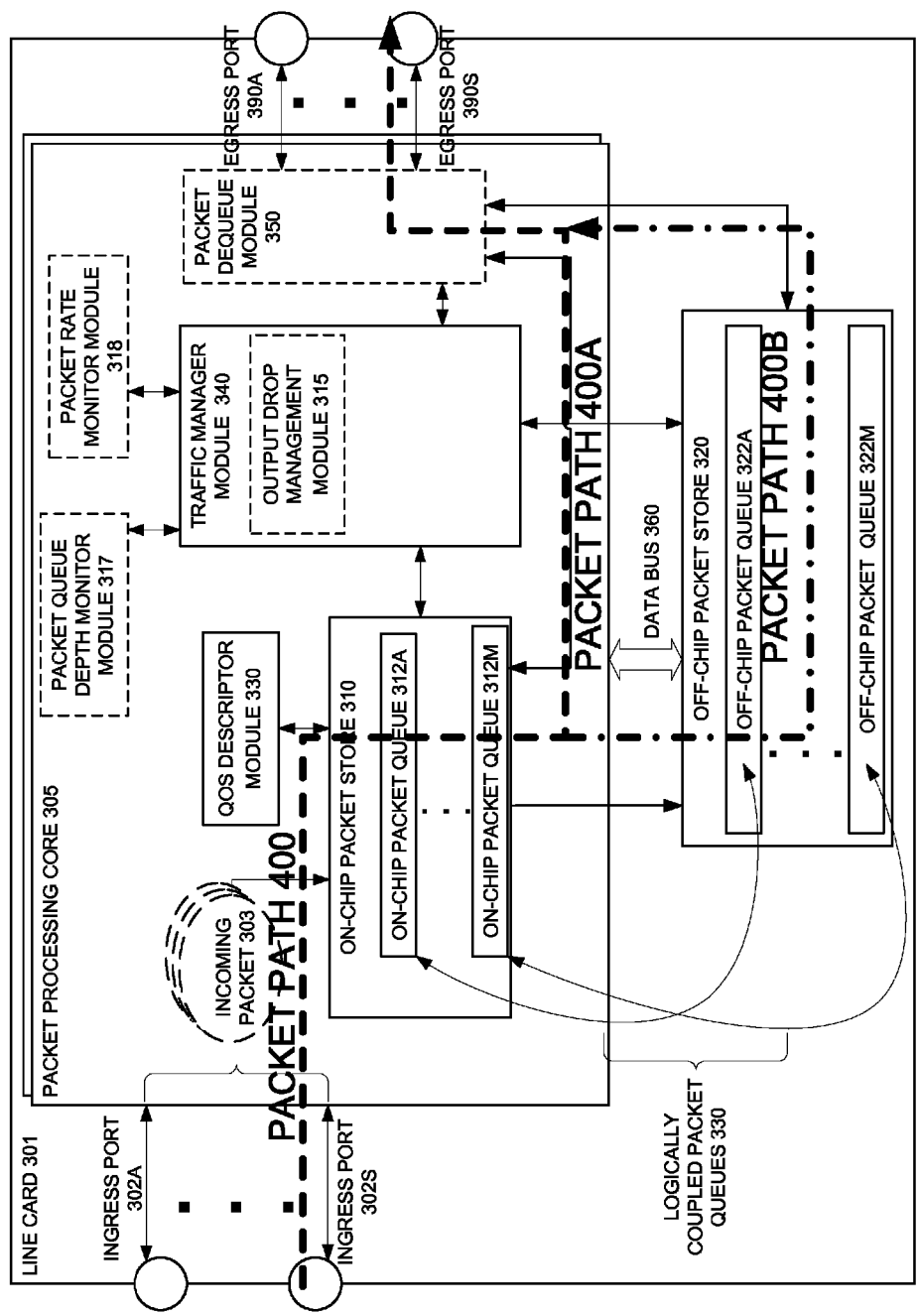
FIG. 4 is a block diagram illustrating paths that a packet travels through on a line card according to embodiments of the invention.

FIG. 4 is a block diagram illustrating paths that a packet travels through on a line card according to embodiments of the invention. This figure is identical to FIG. 3 except that a heavy dashed line is used to indicate two illustrative paths that a packet may take through a packet process core 305 in embodiments of the invention. The packet path 400 begins at one of the ingress ports 302A-302S and moves to the on-chip packet store 310. In one embodiment, the packet path 400 may include travelling through the QoS descriptor module 330 prior to or after arriving at the on-chip packet store 310. In another embodiment, attributes of the packet are communicated to the QoS descriptor module 330 rather than the full packet travelling through the QoS descriptor module 330. From the on-chip packet store 310, the packet path 400 goes to one of the egress ports 390A-390S. The packet path 400 may travel from the on-chip packet queue to the egress port along one of two paths, a first packet path 400A and a second packet path 400B. The first packet path 400A illustrates a packet path for packets that are designated for storage in the on-chip packet store 310 and do not move through the off-chip packet store 320. This first packet path 400A goes from the on-chip packet store 310 to the egress ports 390A-390S without leaving the packet processing core 305. The second packet path 400B illustrates a packet path for packets that are designated for storage in the off-chip packet store 320. Packets traveling through the second packet path 400B move from the on-chip packet store 310 to the off-chip packet store 320 and then onto the egress ports 390A-390S. In embodiments of the invention including a packet dequeue module 350, the first packet path 400A and the second packet path 400B further including moving through the packet dequeue module 350. In other embodiments, the packet paths 400A and 400B may travel through more or less modules within the network element such as the packet paths 400A and 400B travelling through the traffic manager module 340.

Figure 5:
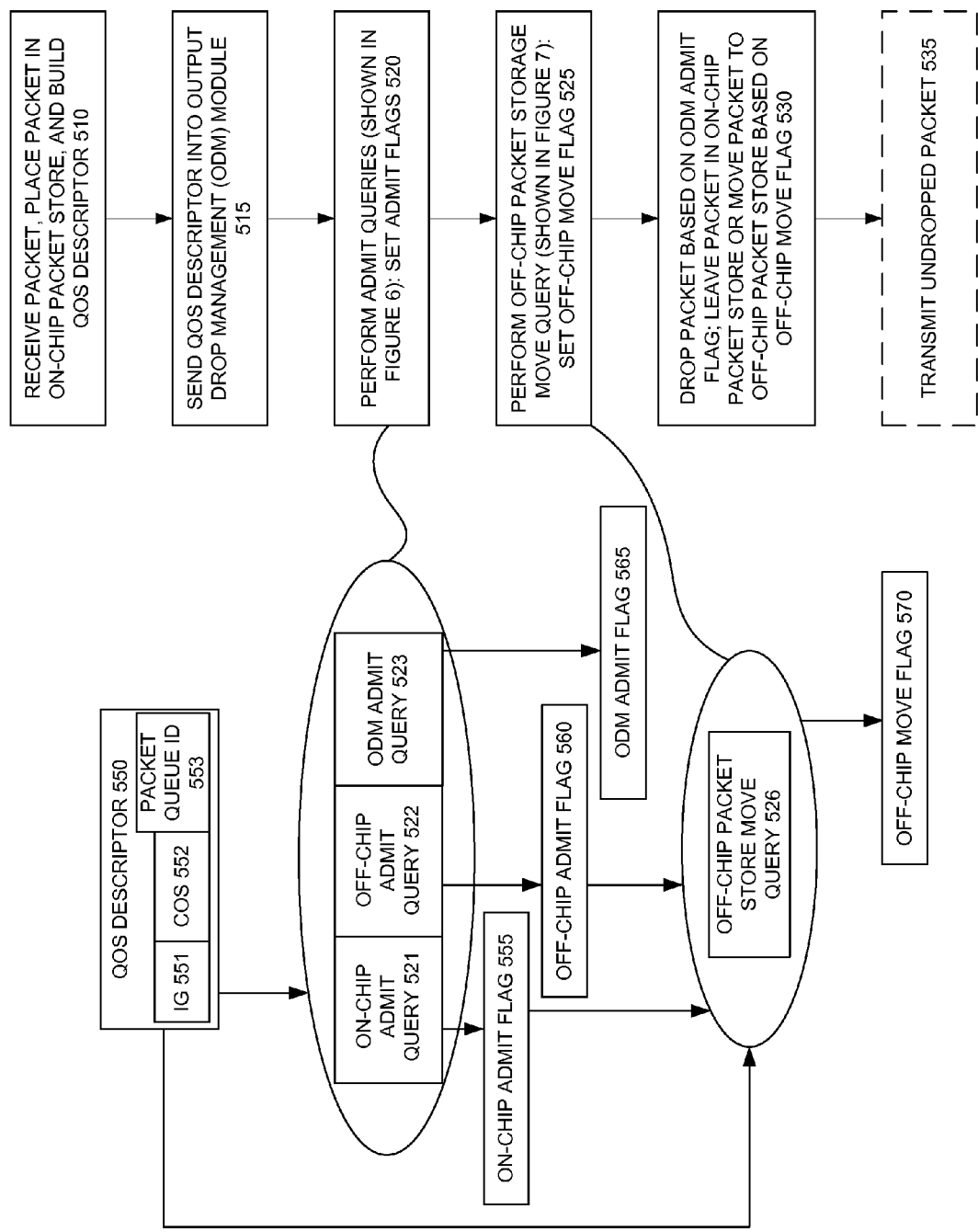
FIG. 5 is a flow chart illustrating a method for storing a first packet in an on-chip packet queue and storing a second packet in an off-chip packet queue according to embodiments of the invention.

FIG. 5 is a flow chart illustrating a method for storing a first packet in an on-chip packet queue and storing a second packet in an off-chip packet queue according to embodiments of the invention. The figure begins at block 510 with receiving a packet, placing the packet in an on-chip packet store such as the on-chip packet store 310 in FIG. 3, and building a QoS descriptor for the received packet. In FIG. 5, the QoS descriptor 550 includes at least three pieces of information, an isolation group (IG) 551, a class of service (CoS) 552, and a packet queue ID 553.

The IG 551 designates a grouping of many packets into a discernible group of packets for metering purposes. Each packet belongs to at least one of many different IGs and each IG 551 contains many packets that have arrived. As a packet is classified into an IG 551, one or more statistics for that IG 551 will be updated to reflect various events associated with that packet. In one embodiment, packet arrival is tracked and statistics associated with the IG 551 are incremented upon the arrival of a packet that belongs to the IG 551. IGs may be classified in many ways. In one embodiment, the IG 551 is based upon a group of subscribers within the same service group. While in another embodiment, the IG 551 is classified as a group of network elements that all belong to a single subscriber, such as a corporate subscriber. In other embodiments, other groupings of packets may be used to designate the IG for the packets such as using the geographic origin of the packets or the originating network of the packets. The CoS 552 designates the level of service to be used for a packet. In one embodiment, the traffic type is used to classify a packet into one of out of many classes of service such that a packet characterized as voice traffic receives a higher priority CoS designation than traffic that is characterized as data traffic because voice traffic is less resilient to transmission delay than data traffic. In another embodiment, a packet header at the network level may be set to indicate a desired class of service such as a differentiated service code point (DSCP) field or a type of service (ToS) field. In yet another embodiment, the CoS 552 is a three bit field at the data link layer when using VLAN tagging as described by IEEE 802.1Q. Still other embodiments may use other fields from other levels of the OSI model to designate the IG 551 and CoS 552 such as classifying the IG and the CoS 552 by inspecting the transport layer and setting the IG 551 and CoS 552 accordingly. The packet queue ID 553 identifies which logically coupled packet queue 330 the packet belongs to so that the size and availability of the corresponding on-chip packet queue 312A-312S and off-chip packet queue 322A-322S may be inspected when determining which packet store to place the packet into.

In block 515, the QoS descriptor 550 for the received packet is sent to an ODM module, such as the one shown as block 315 in FIG. 3. The ODM module classifies the packet for on-chip packet storage or off-chip packet storage. The ODM module performs a set of admit queries, at block 520 and establishes the value of an on-chip admit flag 555, the value of an off-chip admit flag 560, and the value of an ODM admit flag 565. In one embodiment, the three flags are established in three separate queries, an on-chip admit query 521, an off-chip admit query 522, and an ODM admit query 523; these queries will be described in detail with reference to FIG. 6. In another embodiment, the three flags 555, 560, and 565 are established in more or less queries such as a single query that establishes those three flag values. The on-chip admit flag 555 is a value indicating whether the packet could be left in the on-chip packet store (admitted to the on-chip packet queues 312A-312M). The off-chip admit flag 560 is a value indicating whether the packet could be moved to the off-chip packet store (admitted to the off-chip packet queues 322A-322M). The ODM admit flag 565 is a value indication whether the packet can be admitted past the ODM module, packets that cannot be admitted past the ODM module should be dropped to assist in congestion within the network element.

In block 525, the ODM module is used to perform an off-chip packet storage move query. The off-chip packet store move query 525 sets an off-chip move flag 570. One embodiment of ODM module operates in the manner described with reference to FIG. 7. The off-chip move flag 570 is a value indicating whether the packet should be moved into the off-chip packet store 320 into one of the off-chip packet queues 322A-322M.

In block 530, the ODM module drops the packet if the ODM admit flag 565 indicates that the packet will not be admitted past the ODM module. Further, the ODM module moves the packet to the off-chip packet store 320 if the off-chip move flag 570 indicates that the packet should be moved to the off-chip packet store 320 or the ODM module leaves the packet in the on-chip packet store 320 if the off-chip move flag 570 indicates that the packet should not be moved to the off-chip packet store 320. In one embodiment, the ODM module transmits the packet, if it was not dropped, from either the on-chip packet store or the off-chip packet store to the egress ports 390A-390S.

Figure 6:
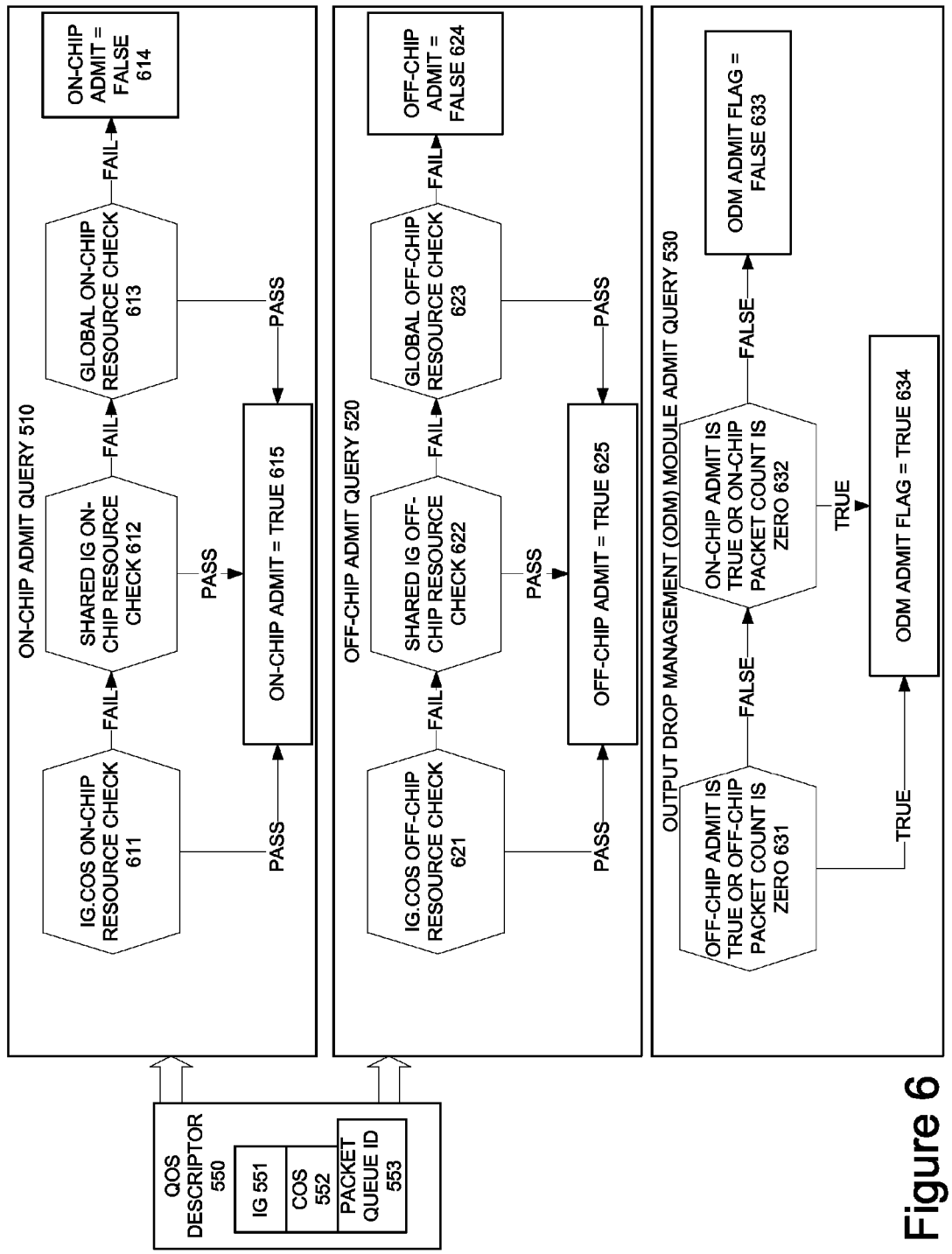
FIG. 6 is a flow chart illustrating a method for determining whether a packet is marked to be dropped according to embodiments of the invention.

FIG. 6 is a flow chart illustrating a method for determining whether a packet is marked to be dropped according to embodiments of the invention. This method is for performing the on-chip admit query 510, the off-chip admin query 520, and the ODM admit query 530. The method utilize the QoS descriptor 550 as described in FIG. 5.

In FIG. 6, the on-chip admit query 510 is shown in the as the first method at the top of the figure. The on-chip admit query 510 starts at IG.CoS on-chip resource check, box 611, by checking whether the on-chip packet store, such as on-chip packet store 310, has resources available for packets that belong to the IG and CoS that correspond to the IG 551 and CoS 552 of the QoS descriptor 550. If resources are available, then the value of on-chip admit flag is established, block 615, to indicate that the packet could be stored in the on-chip packet store 310 in one of the on-chip packet queues 312A-312M. If the IG.CoS on-chip resource check 611 fails, then the on-chip admit query 510 a performs shared IG on-chip resource check, box 612, by checking whether the on-chip packet store has resources available for packets that belong to the IG that corresponds to the IG 551 of the QoS descriptor 550. If resources are available, then the value of on-chip admit flag is established, block 615, to indicate that the packet could be stored in the on-chip packet store 310 in one of the on-chip packet queues 312A-312M. If the shared IG on-chip resource check 612 fails, then the on-chip admit query 510 performs a global on-chip resource check 613 that checks whether there are resources available in the on-chip packet store that are not reserved for a specific IG or CoS. If resources are available according to the global on-chip resource check 613, then the value of on-chip admit flag is established, block 615, to indicate that the packet could be stored in the on-chip packet store 310 in one of the on-chip packet queues 312A-312M. Otherwise, the value of the on-chip admit flag is established, block 615, to indicate that the packet could not be stored in the on-chip packet store 310.

In FIG. 6, the off-chip admit query 510 is shown in the as the second method. The off-chip admit query 510 starts at IG.CoS off-chip resource check, box 621, by checking whether the off-chip packet store, such as off-chip packet store 320, has resources available for packets that belong to the IG and CoS that correspond to the IG 551 and CoS 552 of the QoS descriptor 550. If resources are available, then the value of off-chip admit flag is established, block 625, to indicate that the packet could be stored in the off-chip packet store 320 in one of the off-chip packet queues 322A-322M. If the IG.CoS off-chip resource check 621 fails, then the off-chip admit query 510 performs a shared IG off-chip resource check, box 622, by checking whether the off-chip packet store has resources available for packets that belong to the IG that corresponds to the IG 551 of the QoS descriptor 550. If resources are available, then the value of off-chip admit flag is established, block 625, to indicate that the packet could be stored in the off-chip packet store 320 in one of the off-chip packet queues 322A-322M. If the shared IG off-chip resource check 622 fails, then the off-chip admit query 510 performs a global off-chip resource check 623 that checks whether there are resources available in the off-chip packet store that are not reserved for a specific IG or CoS. If resources are available according to the global off-chip resource check 623, then the value of off-chip admit flag is established, block 625, to indicate that the packet could be stored in the off-chip packet store 320 in one of the off-chip packet queues 322A-322M. Otherwise, the value of the off-chip admit flag is established, block 625, to indicate that the packet could not be stored in the off-chip packet store 320.

In FIG. 6, the ODM admit query 530 is shown as the third method, at the bottom of the figure. One embodiment of the ODM admit query 530 utilizes the off-chip admit flag and the on-chip admit flag. Other embodiments further utilize the number of packets residing in on-chip packet store and the number of packets residing in off-chip packet store. The ODM admit query 530 starts at block 631 by checking whether the off-chip admit flag indicates that the packet could be stored in the off-chip packet store or whether the packet count in the off-chip packet store is 0. In either case, the ODM admit flag is set to indicate that the packet could be admitted past the ODM module at block 634. Otherwise, the method continues at block 632 by checking whether the on-chip admit flag indicates that the packet could be stored in the on-chip packet store or whether the packet count in the on-chip packet store is 0. In either case, the ODM admit flag is set to indicate that the packet could be admitted past the ODM module at block 634. Otherwise, the ODM admit flag is set, at block 633, to indicate that packet could not be admitted past the ODM module, in other words the packet should be dropped.

Figure 7:
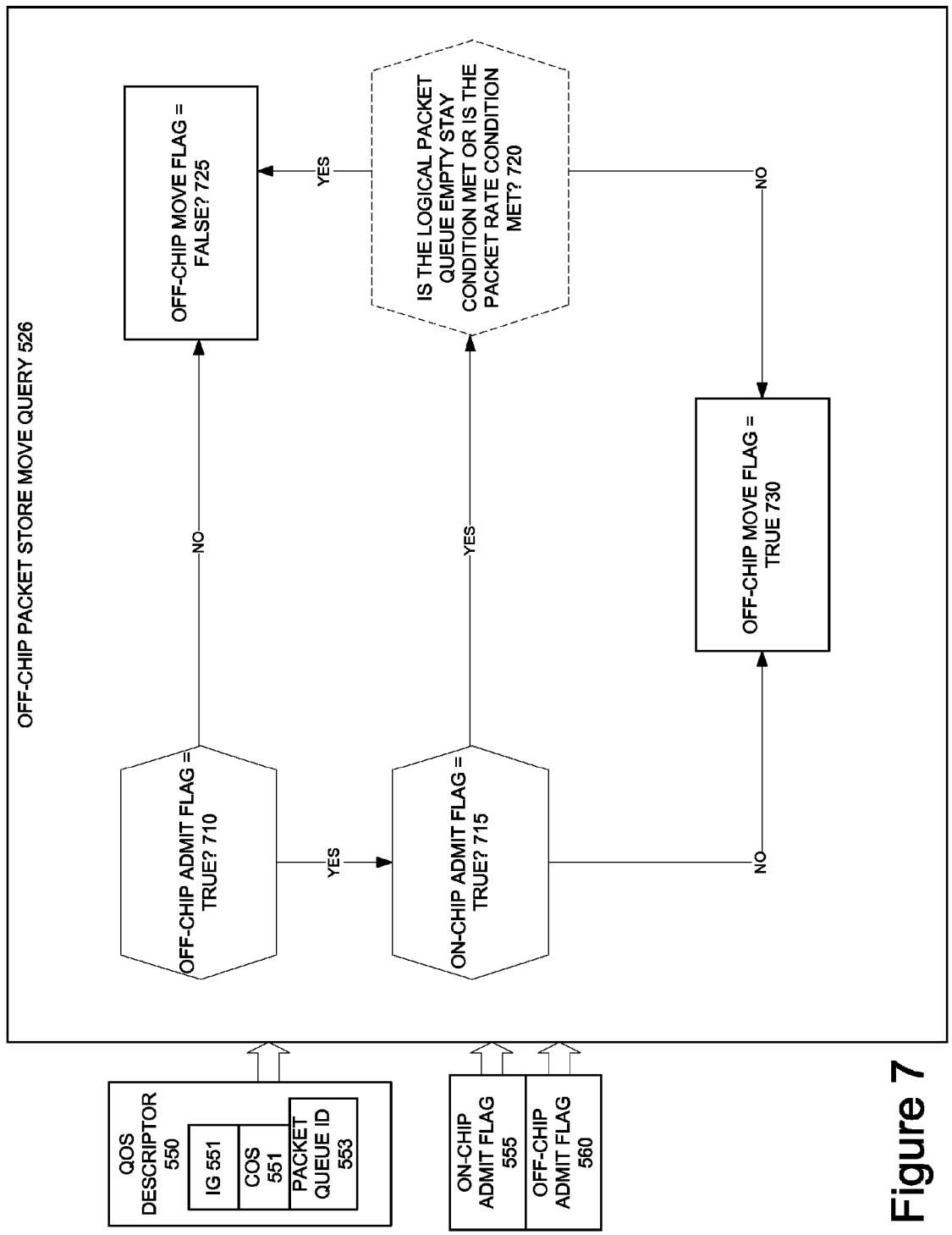
FIG. 7 is a flow chart illustrating a method for determining whether a packet is marked to be moved to an off-chip packet store according to embodiments of the invention.

FIG. 7 is a flow chart illustrating a method for determining whether a packet is marked to be moved to an off-chip packet store according to embodiments of the invention. FIG. 7 illustrates the implementation of an off-chip packet store move query such as the query 526 used in FIG. 5. The method utilizes a QoS descriptor such as QoS descriptor 550 from FIG. 5. Furthermore, the method utilizes an on-chip admit flag 555 and off-chip admit flag 560 such as those described in FIG. 5. The method begins in block 710 by checking whether the off-chip admit flag indicates that the packet could be stored in the off-chip packet store. If the packet could not be stored in the off-chip packet store, e.g. the off-chip admit flag is false, then the off-chip move flag is established to indicate that the packet should not be moved 725, e.g the value of off-chip move flag is set to false. If the off-chip admit flag indicates the packet could be moved to the off-chip packet store, e.g. the off-chip admit flag is set to true, then the method continues to block 715 by checking whether the on-chip admit flag indicates that the packet could be stored in the on-chip packet store. If the packet could not be stored in the on-chip packet store, e.g. the on-chip admit flag is false, then the off-chip move flag is established to indicate that the packet should be moved 730, e.g the value of off-chip move flag is set to true. If the on-chip admit flag indicates the packet could be stored in the on-chip packet store, e.g. the on-chip admit flag is set to true, then the off-chip move flag is established to indicate that the packet should not be moved 725. Optionally, the method performs an additional check, shown as dashed block 720, when both the off-chip admit flag and on-chip admit flag are true. In this embodiment, the method continues from block 715 to block 720 by checking if a logical packet queue empty stay condition is met or if a packet rate condition is met. If either condition is met, then the off-chip move flag is established to indicate that the packet should not be moved 725. Otherwise, the off-chip move flag is established to indicate that the packet should be moved 730.

The logical packet queue empty stay condition is defined as follows. The condition checks first if the logically coupled packet queue identified by the packet queue ID 553 has any packets. If the identified logically coupled packet queue is not empty, then the empty stay condition is not met. If the logically coupled packet queue is empty, then the condition checks if the packet is prioritized for on-chip packet storage or if the number of packets in the on-chip packet store is below a predefined empty stay threshold. If either check passes, then the empty stay condition is met. If neither check passes, then the empty stay condition is not met.

The packet rate condition is defined as follows. The condition checks first if the logically coupled packet queue identified by the packet queue ID 553 has a packet rate below a predefined threshold. If the identified logically coupled packet queue has a rate at or above the threshold, then the packet rate condition is not met. If the logically coupled packet queue has a rate below the threshold, then the condition checks if the packet is prioritized for on-chip packet storage or if the number of packets in the on-chip packet store is below a predefined packet rate stay threshold. If either check passes, then the packet rate condition is met. If neither check passes, then the packet rate condition is not met.

In one embodiment, the CoS field 551 is used to determine the packet's priority for on-chip packet storage, e.g. the CoS field 551 is set to 0. In another embodiment, specific packet queues, identified by the packet queue ID 553, are designated for on-chip priority. In yet another embodiment, specific IGs, identified by the IG field 551, are prioritized for on-chip packet storage. Still other embodiments may use other methods or a combination of the described methods to determine if a packet is prioritized for on-chip packet storage.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution in the set of one or more processors of that electronic device. Of course, one or more parts of an embodiment of the invention may be implemented using different combinations of software, firmware, and/or hardware.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a packet processing core for avoiding memory bandwidth utilization during packet processing, wherein the packet processing core is coupled between an ingress port and an egress port, the method comprising the steps of:
receiving a plurality of packets from the ingress port;
for each of the received plurality of packets:
storing that packet in an on-chip packet store, and
identifying a plurality of quality of service (QoS) characteristics of that packet, wherein the QoS characteristics comprise an isolation group (IG) and a class of service (CoS) within that IG to which that packet belongs;
for a first set of one or more of the received plurality of packets:
determining that at least one packet should be moved to an off-chip packet store prior to the packet being transmitted to the egress port based, at least in part, on that packet's QoS characteristics, wherein the step of determining that at least one packet should be moved to an off-chip packet store includes,
determining that the on-chip packet store does not have available resources designated for the identified CoS in the IG, and
determining that the off-chip packet store does have available resources to store packets that share one of that packet's plurality of QoS characteristics, and
moving that packet to the off-chip packet store;
for a second set of one or more of the received plurality of packets, determining that at least one packet should not be moved to an off-chip packet store prior to the packet being transmitted to the egress port based, at least in part, on that packet's corresponding QoS characteristics;
whereby memory bandwidth utilization on a data bus between the on-chip packet store and the off-chip packet store is conserved because packets determined not to be moved to the off-chip packet store are not sent over the data bus.

2. The method of claim 1, further comprising the steps of:
for each packet in a third set of one or more of the received plurality of packets:

determining that the on-chip packet store does not have available resources to store packets that share one of that packet's plurality of QoS characteristics;
determining that the processing of that packet will fail if that packet is transmitted to the off-chip packet store; and
dropping that packet responsive to the determining processing of that packet will fail if that packet is transmitted to the off-chip packet store.

3. The method of claim 1, wherein the step determining that at least one packet should not be moved to an off-chip packet store prior to the packet being transmitted to the egress port based further comprises the steps of:
determining that the on-chip packet store does not contain any other packets that share one of that packet's plurality of QoS characteristics; and
determining that the off-chip packet store does not contain any other packets that share one of that packet's plurality of QoS characteristics.

4. The method of claim 1, wherein the step of determining that at least one packet should not be moved to an off-chip packet store further comprises the steps of:
identifying a packet rate for the packets that share one of that packet's plurality of QoS characteristics; and
determining that the identified packet rate is below a packet rate threshold.

5. The method of claim 1, wherein the step of determining that the on-chip packet store does not have available resources to store packets that share one of that packet's plurality of QoS characteristics further comprises determining that the on-chip packet store does not have available resources designated for the identified IG.

6. A line card for avoiding memory bandwidth utilization during packet processing, the line card comprising:
an ingress port to receive a plurality of packets;
an egress port to transmit a plurality of packets;
an off-chip packet store to store one or more off-chip packet queues, each off-chip packet queue to store one or more of the received packets prior to transmitting the packets to the plurality of egress ports; and
a packet processing core to process the plurality of received packets, the packet processing core comprising:
an on-chip packet store to store one or more on-chip packet queues, each on-chip packet queue to store one or more of the received packets prior to transmitting the packets to the plurality of egress ports,
a quality of service (QoS) descriptor module to generate a QoS descriptor for each of the received plurality of packets, each of the QoS descriptors to indicate a plurality of QoS characteristics, wherein the QoS descriptor module is to include in the plurality of QoS characteristics for each QoS descriptor an indication of an isolation group (IG) and a class of service (CoS) associated with each of the received plurality of packets,
a traffic manager module to shape packet traffic and to mark one or more of the plurality of received packets for on-chip packet storage or off-chip packet storage based, at least in part, on that packet's QoS descriptor, wherein at least one of the packets is to be marked for on-chip packet storage and at least one of the packets is to be marked for off-chip packet storage, the traffic manager module is further to,
verify that the on-chip packet store has available resources dedicated to the CoS of the IG,
verify that the on-chip packet store has available resources dedicated to the IG,
verify that the on-chip packet store has globally available resources, and
mark the packet for off-chip storage or on-chip storage based on the outcome of the on-chip verification steps, and
wherein, the packet processing core is further to move only those packets that are marked for off-chip packet storage to the off-chip packet store while keeping the other packets in the on-chip packet store until they are transmitted to the egress port;
whereby at least one of the packet processing cores is to conserve off-chip memory bandwidth by only transferring packets classified for off-chip packet storage to the off-chip packet store.

7. The line card of claim 6, wherein:
the packet processing core further comprises a packet queue depth monitor module coupled to the traffic manager module, the on-chip packet store, and the off-chip packet store, the packet queue depth monitor module to track an amount of packets in one or more of the off-chip packet queues and an amount of packets in or more of the on-chip packet queues; and
the traffic manager module is further to, for each of the received plurality of packets:
identify a number of queued on-chip packets that share one of that packet's plurality of QoS characteristics,
identify a number of queued off-chip packets that share one of that packet's plurality of QoS characteristics,
base, at least in part, the marking of that packet for on-chip packet storage or off-chip packet storage on the number of queued on-chip packets that share one of that packet's plurality of QoS characteristics, and
base, at least in part, the marking of that packet for on-chip packet storage or off-chip packet storage on the number of queued off-chip packets that share one of that packet's plurality of QoS characteristics.

8. The line card of claim 6, wherein:
the packet processing core further comprises a packet queue depth monitor module coupled to the traffic manager module, the on-chip packet store, and the off-chip packet store, the packet queue depth monitor module to track an amount space available in one or more of the off-chip packet queues and an amount space available in or more of the on-chip packet queues; and
the traffic manager module is further to, for each of the received plurality of packets:
identify an amount of space available in an on-chip packet queue for packets that share one of that packet's plurality of QoS characteristics,
identify an amount of space available in an off-chip packet queue for packets that share one of that packet's plurality of QoS characteristics,
base, at least in part, the marking of that packet for on-chip packet storage or off-chip packet storage on the amount of space available in the off-chip packet queue for packets that share one of that packet's plurality of QoS characteristics, and
base, at least in part, the marking of that packet for on-chip packet storage or off-chip packet storage on the amount of space available in the on-chip packet queue for packets that share one of that packet's plurality of QoS characteristics.

9. The line card of claim 6, wherein:
the packet processing core further comprises a packet rate monitor module to track packet rates that corresponds to packets that share one of the plurality of QoS characteristics for each packet; and the traffic manager module is further to:
base in part, for each of the received plurality of packets, the marking of that packet for on-chip packet storage or off-chip packet storage on that packet's packet rate.

10. The line card of claim 6, wherein:
the traffic manager module is further to:
verify that the off-chip packet store has available resources dedicated to the CoS of the IG,
verify that the off-chip packet store has available resources dedicated to the IG,
verify that the off-chip packet store has globally available resources, and
mark the packet for off-chip storage or on-chip storage also based on the outcome of the off-chip verification steps.

11. The line card of claim 6, wherein the traffic manage module is further to:
identify, for each of the received plurality of packets, a traffic priority level for that packet; and
base in part, for each of the received plurality of packets, the marking of that packet for on-chip packet storage or off-chip packet storage on that packet's traffic priority level.

12. A method performed in a packet processing core for avoiding memory bandwidth utilization during packet processing, wherein the packet processing core is coupled between a plurality of ingress ports and a plurality of egress ports, the method comprising the steps of:
receiving a first packet from the plurality of ingress ports;
building a first quality of service (QoS) descriptor for the first packet, the QoS descriptor comprising a plurality of QoS characteristics;
storing the first packet in a first packet queue in an on-chip packet store, the first packet queue associated with packets that share one of the first's packets QoS characteristics;
receiving a second packet from the plurality of ingress ports;
building a second QoS descriptor for the second packet, wherein the second QoS descriptor includes information identifying an isolation group (IG) and a class of service (CoS) within that IG;
classifying the second packet for storage in an off-chip packet store based, at least in part, on the second QoS descriptor, wherein the step of classifying the second packet for storage in the off-chip packet store includes,
determining that the on-chip packet store does not have available resources designated for the IG, and
determining that the on-chip packet store does not have available resources designated for the CoS within the IG;
storing the second packet in a second packet queue in an off-chip packet store, the second packet queue associated with packets that share one of the first's packets QoS characteristics; and
whereby off-chip memory bandwidth is conserved because the first packet is classified for on-chip packet storage and is not sent to the second packet queue that is in the off-chip packet store.

13. The method of claim 12, wherein the first packet and the second packet share one of the first's packet QoS characteristics such that the first packet and the second packet are considered to be in a common group of packets based the shared QoS characteristic.

14. The method of claim 13, wherein the first packet queue and the second packet are logically coupled to store one or more on-chip packets and one or more off-chip packets, the on-chip packets and the off-chip packets belonging to packets that share one of the first's packets QoS characteristics.

15. The method of claim 13, wherein the classifying step further comprises the step of verifying that the second packet is not prioritized for on-chip packet storage.

16. The method of claim 13, wherein the classifying step further comprises the steps of:
determining a lack of available on-chip resources designated for the first packet queue; and
determining an availability of off-chip resources designated for the second packet queue.

* * * * *

UNITED STATES PATENT AND TRADEMARK OFFICE
CERTIFICATE OF CORRECTION

| | |
|---|---|
| PATENT NO. | : 8,897,316 B2 |
| APPLICATION NO. | : 12/983104 |
| DATED | : November 25, 2014 |
| INVENTOR(S) | : Chen et al. |

It is certified that error appears in the above-identified patent and that said Letters Patent is hereby corrected as shown below:

On the title page, item (56), under "OTHER PUBLICATIONS", in Column 2, Line 3, delete "enitraffic" and insert -- en/traffic --, therefor.

In the specification

In Column 11, Line 18, delete "store 320" and insert -- store 310 --, therefor.

In Column 11, Line 27, delete "admin query 520," and insert -- admit query 522, --, therefor.

In Column 11, Line 60, delete "query 510" and insert -- query 522 --, therefor.

In Column 11, Line 61, delete "query 510" and insert -- query 522 --, therefor.

In Column 12, Line 4, delete "query 510" and insert -- query 522 --, therefor.

In Column 12, Line 12, delete "query 510" and insert -- query 522 --, therefor.

Signed and Sealed this
Sixth Day of October, 2015

Michelle K. Lee
*Director of the United States Patent and Trademark Office*